United States Patent [19]
Wiklund

[11] Patent Number: 5,051,934
[45] Date of Patent: Sep. 24, 1991

[54] ANCILLARY ARRANGEMENT FOR INCLUSION IN A DISTANCE MEASURING INSTRUMENT

[75] Inventor: Klas R. Wiklund, Täby, Sweden

[73] Assignee: Geotronics AB, Danderyd, Sweden

[21] Appl. No.: 288,161

[22] Filed: Dec. 22, 1988

[30] Foreign Application Priority Data

Dec. 22, 1987 [SE] Sweden .................... 8705123

[51] Int. Cl.$^5$ .......................... G06F 15/20
[52] U.S. Cl. .................... 364/561; 356/152; 364/505
[58] Field of Search ........ 356/5, 152, 141, 11, 356/15, 16, 19, 142, 147; 364/561, 420, 560, 505, 514; 340/815.02, 815.03, 815.04, 815.1; 455/605, 617; 33/290, 700

[56] References Cited

U.S. PATENT DOCUMENTS

| | | | |
|---|---|---|---|
| 4,278,966 | 7/1981 | Hemsher | 340/815.1 |
| 4,413,907 | 11/1983 | Lane | 356/5 |
| 4,560,270 | 12/1985 | Wiklund et al. | 455/605 |
| 4,600,997 | 7/1986 | Cain et al. | 364/505 |
| 4,674,870 | 6/1987 | Cain et al. | 356/152 |
| 4,676,634 | 6/1987 | Petersen | 356/152 |
| 4,681,433 | 7/1987 | Aeschlimann | 356/152 |
| 4,712,915 | 12/1987 | Kosakowski et al. | 356/152 |
| 4,820,041 | 4/1989 | Davidson et al. | 356/152 |

OTHER PUBLICATIONS

Geodimeter, 1983, "Geodimeter Systems for Construction Design & Implementation", 4 pages.
Geodimeter, 1983, "Tracklight General Description", 1 page.
Geodimeter, 1985, "The Very First Powerful Field System for Tacheometry", 4 pages.
Geodimeter, 1983, "Geodimeter Systems for Computer Aided Mapping", 4 pages.

*Primary Examiner*—Kevin J. Teska
*Attorney, Agent, or Firm*—Pollock, Vande Sande & Priddy

[57] ABSTRACT

The present invention relates to an arrangement for coaction with a distance measuring instrument in the setting out of boundaries or like demarcations. The distance measuring instrument includes an electronic distance meter, a vertical angle meter (18) and a horizontal angle meter (19), a signal processing and computer unit (16, 16') which computes the position of a measuring reflector (12) in relation to the instrument, and an input means (17) for input of desired setting-out data for an area of land into a memory location in the computer prior to a setting-out operation. The distance measuring instrument is held directed towards the measuring reflector and repeatedly makes measurements thereon. With each measuring occasion, the computer unit (16) ascertains whether or not the data obtained lies within a predetermined, acceptable tolerance range in relation to the setting-out data. If the measured data lies outside this range, the computer establishes how the reflector should be moved in order to be located within the tolerance range. An indicator is controlled by the movement signals produced by the computer unit and in response to these signals continuously gives to a person positioned adjacent the reflector a clear, discernible indication of whether the reflector shall be moved, and if so, in which direction or directions, or if the reflector should be left as it is.

11 Claims, 4 Drawing Sheets

ANCILLARY ARRANGEMENT FOR INCLUSION IN A DISTANCE MEASURING INSTRUMENT

FIELD OF THE INVENTION

The present invention relates to an ancillary arrangement for application with a distance measuring instrument when setting-out boundary marks, the distance measuring instrument being of the kind which includes an electronic distance meter, a vertical angle meter and a horizontal angle meter, a signal processing and computing unit which computes the position of a measuring reflector in relation to the instrument, and input means for input of the desired boundary settings of an area of ground into a memory location of a memory store in said computing unit prior to setting-out said boundary or like demarcation.

When taking measurements for staking or setting out land boundaries or like marks, such as the boundaries of housing plots, or the setting out of road geometries, ground-level planning or like survey parameters, with the aid of a linear distance measuring instrument which includes a theodolite and an electronic distance meter, a linear distance measuring instrument is placed on the plot or area of land to be surveyed and measurements are then made against reference points of known location. The result of this measuring process is used to calculate the exact location of the measuring instrument. The actual process of setting or staking out the boundaries is then commenced. In this respect, the person operating the measuring instrument commands an assistant, who carries a rod bearing a prism, to place the rod and therewith the prism on a given spot or on a spot located along a predetermined path. The distances between the instrument and the spot on which the prism is to be located are sometimes very long and consequently, in such cases, it must be possible to communicate clearly from the instrument to the assistant carrying the rod and prism, in order to facilitate the boundary marking procedure.

BACKGROUND OF THE INVENTION

A known instrument Provided with auxiliary means for facilitating the setting out of boundaries is described and illustrated in U.S. Pat. No. 4,560,270. This instrument incorporates a one-way sound transmitting facility, by means of which audible instructions can be sent from the measuring instrument to the prism carrier. This facility enables the instrument operator to verbally direct the prism carrier to the desired boundary mark or setting out location. This instrument is also provided with a line sighting instrument which is mounted in a fixed position in relation to the electronic distance gauge although not connected electronically thereto, and which emits two slightly diverging light beams of mutually different character. The two light beams overlap one another in a relatively narrow central zone.

This instrument includes a minicomputer into which there is fed data concerning the setting-out points or boundary line settings or area boundary settings for the region to be set-out or staked. If the boundary is to be marked or set out in point form, the instrument operator feeds into the computer the point number of each boundary marking point concerned. An indicator then displays data concerning these setting-out points in relation to the instrument, e.g., such data as horizontal angle settings, horizontal distances and possibly also vertical distances, these settings and distances being calculated by the computer subsequent to carrying out the aforesaid measurements against a reference point. The operator then adjusts the setting of the instrument to the given horizontal angle setting. The prism is then moved by the assistant to a point on the plot at which the two light beams transmitted from the direction indicating unit of the instrument overlap one another and at which the prism on the setting-out rod is in alignment with the measuring instrument. The instrument continuously measures the distance to the prism and the gradient of the electronic distance meter (EDM). The horizontal distance is calculated and presented on the indicator. The instrument operator instructs the assistant carrying the prism to move closer to or further away from the instrument until the distance shown coincides with the distance given for the setting-out point in question. Although the work of staking out boundary points can be effected relatively smoothly with this known instrument, it requires that the two persons concrned be able to communicate with one another.

SUMMARY OF THE INVENTION

An object of the present invention is to provide a surveying arrangement for use in conjunction with a distance measuring instrument for use when setting out boundary marks, where the prism bearer is directed towards the correct boundary marking point with the aid of an indicator which constantly and automatically discloses to the bearer those movements which need to be made, in all desirable directions, in order to bring the prism to the correct boundary mark, i.e., without the aid of instructions from the operator of the measuring instrument.

Another object of the invention is to provide an arrangement which, if desired, can be operated by solely one person, namely the prism bearer.

According to one aspect of the invention, the distance measuring instrument is adapted to be held directed towards the reflector and to carry out repeated measurements thereon. Also according to this aspect of the invention, the computing unit is constructed to ascertain with each measurement operation whether the measuring data obtained coincides or deviates from setting-out data within a predetermined acceptable tolerance range, and, when deviation is observed, to compute the direction or directions in which the reflector must be moved in order to be positioned in a location determined by said setting-out data. There is also provided an indicator which is steered by the movement direction signals produced by the computing unit, such as to produce continuously, on the basis of said signals, a clearly discernible indication of a code which can be readily understood during a working procedure by a person placed adjacent the reflector, and which indicates whether the position of the reflector should be moved, and if so, in which directions, or whether the reflector should remain where it is.

The indicator is preferably an optical indicator placed on the measuring instrument and is constructed to give a light signal in the form of a simple discernible code for each of the intended directional movements of the reflector to be indicated, e.g., to transmit light of different colors for positional changes in a first direction and flashing lights of different flashing characters for positional changes in a second direction. The indicator may be firmly mounted on the instrument and directed to transmit a selectively coded light beam in essentially the same horizontal angle position as the measuring beam transmitted by the instrument.

According to another aspect of the invention, the indicator is a rotatable unit which is mounted on the instrument and which is constructed to emit two light beams which lie side by side and which partially overlap one another in a narrow region, and which are intended to be turned, in a direction towards the angle position (in horizontal or vertical direction) to which the reflector is to be moved, by a rotational motor controlled by the computing unit; and the computing unit is constructed to control the indicator such that the indicator will cause the light beam to flash on and off in a predetermined flashing sequence indicative of the movement required of the measuring object in a second direction in order for the reflector to be positioned in a location determined by the boundary setting data fed into the memory of the computing unit.

According to still another aspect of the invention where the distance measuring instrument is intended for use as an aid in working a large surface area, the computing unit is constructed to cause the indicator to emit the same form of coding, e.g., a flashing light for deviations outside the area in one direction but having a first kind of code character for deviation along a first coordinate direction and a second kind of code character for deviation along a second coordinate direction, and optionally to produce another type of coding, e.g., color, of different code character for deviation from the area, e.g., red or green, for indicating the direction in which the deviation has occurred.

BRIEF DESCRIPTION OF THE DRAWINGS

The invention will now be described in more detail with reference to the accompanying drawings, in which several embodiments of the invention are shown for purposes of illustration, and in which.

DESCRIPTION OF PREFERRED EMBODIMENT

Figure 1:
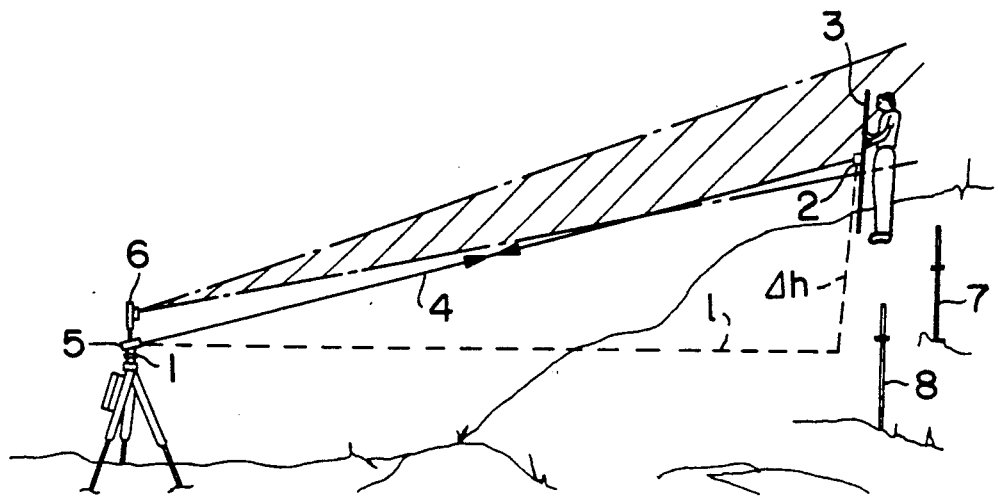
FIG. 1 is a pictographic illustration of a boundary marking operation carried out in open countryside.

FIG. 1 illustrates a boundary staking routine in which there is used a distance measuring instrument 1 equipped with the inventive arrangement and having a prism tracking facility, such as to hold the instrument automatically in constant alignment with a prism 2 carried on a staking rod 3 when the prism is located in the path of a measuring beam 4 emitted from an electronic distance meter (EDM) 5 incorporated in the measuring instrument. The electronic distance meter, hereinafter referred to as the EDM. is preferably of the phase comparison type, although EDMs of the pulse-time measuring type or some other type of direct measuring distance meters can also be used.

Electronic distance meters of the phase comparison type measure the distance to a target, by making a phase comparison between a transmitted, modulated beam of light and the light signal received after reflection from the target. The light signal is modulated with a high frequency periodic signal, which is most often a sinusoidal or square wave signal. Common modulating signal frequencies are ca 15 MHz and 150 KHz or 30 MHz and 300 KHz. Most distance meters of this kind measure against a reflector, e.g., a cube corner prism or the like, placed on the target.

The instrument 1 includes an indicator 6, which in the case of the illustrated embodiment is placed above the EDM 5, but which may be located in some other position. The EDM 5 measures the gradient distance to the prism 2. The instrument 1 is also provided with a horizontal angle indicator which indicates the EDM-bearing in a horizontal direction, i.e., the horizontal angle in relation to a reference angle position, and also with a vertical angle indicator which indicates the vertical angle in relation to a horizontal plane. As is normal with a distance measuring instrument of this kind, the instrument calculates the horizontal distance 1 and the height differential $\Delta h$ on the basis of the EDMs measuring result and the signal given by the vertical angle detector.

The positions of the individual boundary points which graphically mark the boundary line, the route to be followed by a road, or the extent of an area of land, are determined prior to setting out the boundaries or like marks. The positional data is calculated and fed into the memory of the computer incorporated in the instrument, before starting to set out the boundary points. Subsequent to setting up the instrument in the area within which boundaries are to be set out, distance measurements are made against one or more reference objects. The computer calculates the position of the instrument and re-calculates the positional data stored therein with respect to the demarcation points to be set out to suitable instrument setting data, preferably in polar coordinates with the instrument in origo.

According to the invention, the instrument takes continuous measurements. i.e., repeatedly at short intervals, against a prism, which is preferably carried on a setting-out rod, as the rod and prism are carried around by the prism bearer. The measured and computed values of horizontal length and either horizontal angle or height difference or optionally all three values are compared with setting-out point data for either a selected number of a plurality of setting out points, or data for the nearest point on a linear line extension, or data within a given delimited area of the terrain. The result of this comparison is fed into the indicator 6, which produces an optical signal which can be readily discerned by the prism bearer and which has mutually different codings indicating whether and how the prism should be moved in order to be located at an appropriate setting-out point. For instance, this coding may be such that if the prism is in the wrong horizontal angle position, the indicator 6 will produce. e.g., a red light if the prism needs to be moved to the right and a green light if the prism needs to be moved to the left. The coding may also be such that when the prism is located within an acceptable horizontal angle range, the indicator will produce a light which has an additive blend of green and red, or a light of some different color, for instance pure white.

When setting the vertical position of the prism, corresponding color codings can be used to indicate that the prism is to be moved up or down. Optionally, other indicating colors can be used. It will be understood that data pertaining to whether the indicator is to indicate a desired change in the horizontal direction or in the vertical direction is fed into the instrument computer at the same time as the data concerning the desired boundary settings.

In order to indicate at the same time that the prism is located at the correct distance from the instrument, the indicator is constructed to emit a flashing light beam in correspondence with the measured and computed horizontal distance from the instrument, for instance such that the letter N will be transmitted in morse code if the prism is to be moved closer to the instrument, and the morse code signal for the letter A is transmitted when the prism is to be moved further away from said instrument, and such that a steady light beam is transmitted when the prism is located on the intended boundary point, boundary line or boundary area. Naturally, these movement indicating codes can be interchanged without departing from the scope of the invention. For instance, mutually different flashing frequencies can be used for separate flashing codes.

The indicator 6 will preferably be constructed for solely two types of light beam codes, e.g., color codes and character or numerical flashing codes, since it will be difficult for the prism bearer to understand several types of coding at one and the same time and move the prism in response thereto, without getting the various codes confused. However, it is possible, within the scope of the invention, also to change, e.g., the frequency of transmitted flashing light beams so as to indicate a change along a third coordinate, even though such a facility will probably not be needed in practice.

The prism 2 is secured to the rod 3 with the aid of a clamp connector. When this rod is positioned correctly in the terrain or area being surveyed, the prism is removed and placed on a new rod 3. All rods are optionally fitted with a height indicator which indicates the vertical position occupied by the prism prior to its removal, as indicated by the staked-out rods 7 and 8 in FIG. 1.

Figure 2:
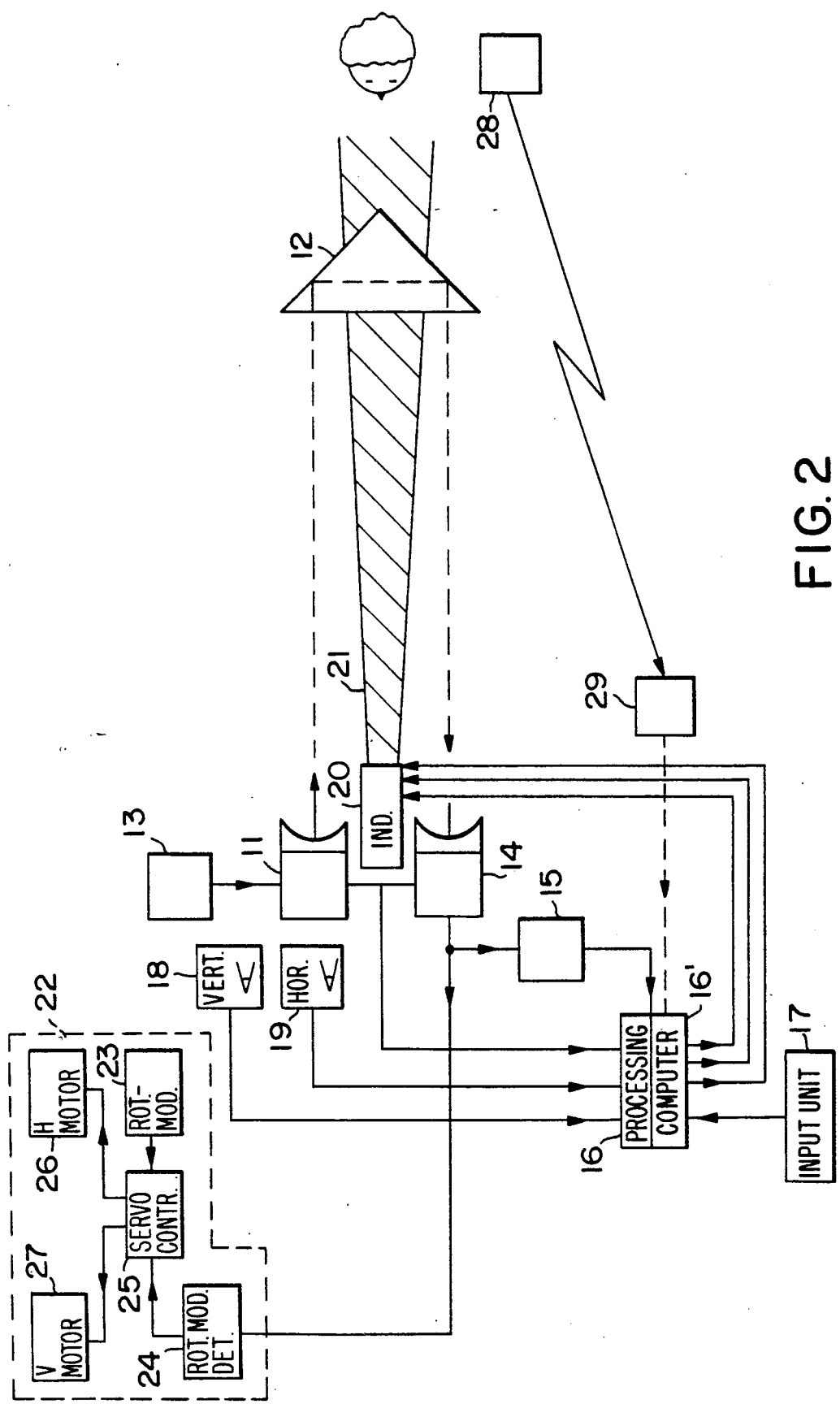
FIG. 2 is a block schematic diagram of a distance measuring instrument equipped with a first embodiment of the inventive arrangement.

FIG. 2 is a block schematic diagram which illustrates a distance measuring instrument equipped with a first embodiment of the inventive arrangement. A transmitter 11 transmits a modulated, substantially collimated electromagnetic light beam towards a reflector 12, preferably a cube corner prism. The beam source in the transmitter 11 may, for instance, have the form of an incandescent lamp, a mercury vapor discharge lamp, a laser, and then preferably a laser of the HeNe-type, or a light diode operative in the infrared radiation range. A periodic signal is produced by an oscillator 13 and sent to the transmitter 11 for modulation of the output signal, said periodic signal most often being of sinusoidal or square wave shape and having a frequency which lies preferably within the range of 0.1-30 MHz.

The signal reflected by the reflector 12 is received by a receiver 14 and fed to signal processing circuits 16, via a high pass filter 15. A signal which corresponds to the transmitted signal is also fed into the processing circuits 16. The circuits 16 make a comparison between the phase of the modulating signal on the transmitted light beam with the phase of the modulating signal on the received light beam. The distance is computed from the phase difference.

The circuits 16 include, inter alia, a computer 16' which carries out a number of the requisite computations and into which data concerning a staking or setting out area can be inputted by an input unit 17. In accordance with the invention, this computer is utilized to read-off the horizontal angle and vertical angle indicators 18 and 19, respectively for each setting-out point with each distance measurement, and to compare these measured and computed values of horizontal and vertical distances and horizontal angle positions with the stored control values, and to send to an indicator 20 control signals which cause the indicator to transmit to the prism carrier the afore-described types of light signals in a lobe 21.

The distance measuring instrument can be brought into constant alignment with the prism bearer manually by an instrument operator, preferably, however, the instrument will be provided with a known arrangement 22, by means of which the instrument can be held automatically in constant alignment with the prism 12. The instrument can be unmanned in this latter case. An example of such an alignment arrangement is described in U.S. Pat. No. 4,712,915. According to this patent, rotational modulation is introduced on the periphery of the measuring light beam by a modulator 23. That part of the received light beam which concerns this rotational modulation is indicated separately in a rotation modulating detector and evaluating unit 24. A signal from the rotation modulator 23, which indicates the angular position of the modulation, and the signal from the rotation modulator detector, which represents an error of alignment with the prism in the horizontal and vertical direction, are sent to a servo-control unit 24, which steers a motor 26 for controlling horizontal alignment of the instrument, and to a motor 27 for controlling the vertical alignment of the instrument, so that the signals from the unit 24 will be as small as possible.

When the entire boundary staking or like procedure is to be carried out by only one person, it can be difficult for this person to run forwards and backwards between the instrument and the prism with each setting-out point, when boundary points are to be set out, and to insert the number of the next setting-out point into the input unit 17. Consequently, the prism bearer may be equipped with a cordless signal digit code transmitter and the instrument provided with a receiver 29 compatible with the transmitter 28. The output signal from the receiver 29 is applied to an input of the computer of the signal processing unit 16, which computer, after each digit code received, will then, in accordance with its program, make comparisons between the coordinates, with the instrument in origo, of the measured values and the setting-out point (e.g., the third) stored in the computer memory and corresponding to the given digit code (in this case the number 3). and with the aid of the indicator 20 guide the prism carrier to this setting-out or boundary point. It is relatively costly, however, to provide the measuring equipment with the units 28 and 29.

The most usual type of setting-out procedure, however, is that undertaken along a line when surveying the bearings of a road, for instance. In this case, the computer need not be furnished with information concerning a new setting-out point, since, irrespective of where the prism bearer is located, the instrument will preferably calculate the direction of the normal to the line which passes through the prism location in question and cause the indicator 20 to emit a light indication which leads the prism bearer along the normal to the intended line. Instead of calculating the direction of a normal to the line, however, when setting-out marks along a line it is possible to send a neutral color signal always in those instances when a part of said line is located in the geometric extension of the instrument alignment and thus only send a color signal when the extension of said line lies outside said instrument alignment and to cause the indicator 20 to show whether a point on the line in the direction to instrument alignment is closer to or further away from the instrument. In this case, indication is given for desired movement in two directions, i.e., desired horizontal angular movement of the prism and radial movement thereof.

The inventive arrangement can also be used for work in a precisely defined area. One example in this respect is the machining of a plot of land, e.g., a football pitch, for instance with the aid of a levelling machine, for the purpose of obtaining an even and smooth surface which is perfectly horizontal to a given desired elevation. The machine can then be equipped with a reflector, or, if the machine is able to turn in relation to the measuring instrument, with several reflectors, e.g., placed in a circle around a post extending vertically from the machine. In this case, the computer 16' is programmed to instruct the indicator 20 to show different colors for different deviations from the desired elevation or level. The area, or pitch, to be worked is often quite large. Consequently, it is relatively simple to position the machine so that it is known that the machine is actually located in the area to be worked. If the machine should leave this area as work is in progress, the machine operator will know in which direction the machine has erred. Consequently, in this case, the computer can be supplied with data which causes the indicator to show that the machine has left said area in a radial direction from the measuring instrument, with the aid of the same flashing signal, e.g., a morse-code N, and to show that the machine has left the area in a horizontal angle direction, with the aid of another flashing signal configuration, e.g., a morse-code A.

Naturally, flashing codes other than N and A can be used, such as short and long flashes on different flashing frequencies.

Figure 3:
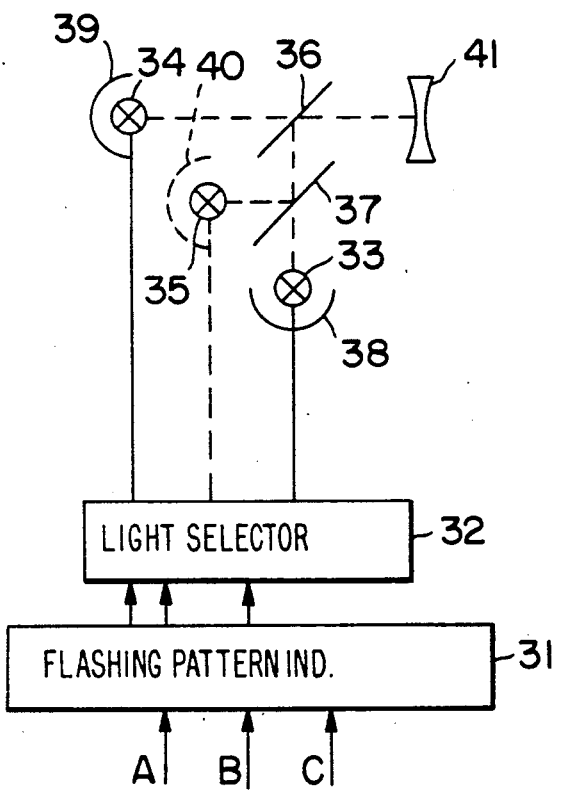
FIG. 3 illustrates schematically the construction of one embodiment of the indicator included in the FIG. 2 schematic.

FIG. 3 illustrates an embodiment of the indicator unit 20. The three signals A, B, C sent by the computer 16' and indicating desired positional movement of the reflector in a horizontal and/or vertical and/or radial direction in relation to the measuring instrument are fed into a flashing pattern indicator 31. The pattern indicator 31 sends a first signal to a light selector 32 with the frequency and code that corresponds to the incoming signals, and also a second signal which corresponds to the colors that correspond to said incoming signals.

The system preferably include two lamps 33, 34, or some other type of light source, of different colors, e.g. green and red respectively. The light selector is controlled so as to ignite one or the other of said lamps (in the ignition sequence given by the pattern indicator 31) when a deviation in one direction or the other occurs, and to ignite both lamps when the prism is located within an acceptable tolerance range. Since blending of the colors of the light sources takes place additively, the light will become grey or white when both lamps are ignited. Instead of causing both lamps to shine simultaneously, an additional light source 35, which preferably emits a white light, may be ignited separately when the prism is located within the tolerance range, the light sources 33, 34 being extinguished on this occurrence. The transmitted light signal may be given colors of different strengths or brightness, in dependence on how close the prism is located to the acceptable tolerance range, e.g., by causing the additional light source 35 to be ignited at the same time as the selected one of said two light sources 33, 34 when the prism is located within a predetermined approximate area close to the acceptable tolerance range. This can be effected either with an extra light within the whole of the approximate area or with a light signal which increases continuously strength or intensity in towards the tolerance range. The light from the light sources 33-35 is directed into the outgoing beam path by obliquely positioned semi-transparent mirrors 36, 37 in a manner conventional in the art. Each light source may be provided with a respective reflector 38, 39 and 40, preferably with its center placed cylindrically or spherically with the light source, so that an approximately collimated light beam can be transmitted from each of the light sources. A slightly negative lens 41 produces desired divergence of the emitted light beam.

Figure 4:
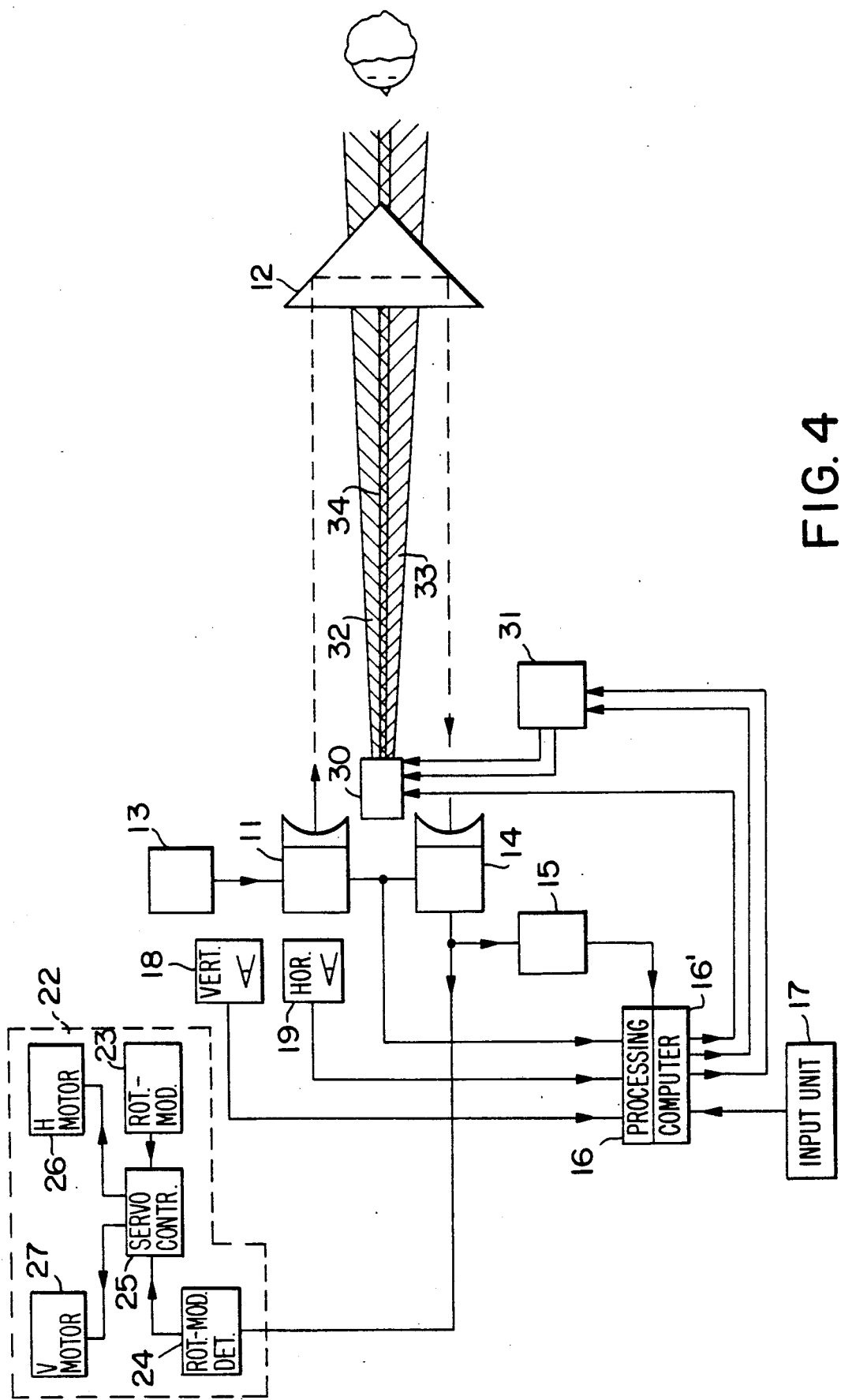
FIG. 4 is a block schematic diagram illustrating a distance measuring instrument equipped with another embodiment of the inventive arrangement.

FIG. 4 illustrates a second embodiment of the invention. This embodiment includes a unit which emits two light beams 32, 33, which lie side by side and have different colors, e.g., green and red. Each of the two light beams 32 and 33 is slightly divergent and the beams overlap one another in a central zone 34. One such unit is described in the aforementioned U.S. Pat. No. 4,560,270 and is intended as an ancillary device for a distance measuring instrument of the kind designated GEODIMETER ®. According to the present invention, a unit 30 of this kind is pivotally mounted on the distance measuring instrument. The computer 16' instructs a controllable rotational motor 31 to turn the unit 30 in the direction in which the prism is to be moved, e.g., in the horizontal angle position, as calculated by the computer 16'. The whole arrangement 30, 31 can also be rotated to two positions, such that in one position the light beams 32, 33 are located horizontally side by side and are vertical in the other position, depending on whether it is the horizontal angle position or vertical angle position that is to be changed.

As already mentioned, in accordance with the invention the EDM 11, 14 of the measuring instrument is constantly aligned with the prism, preferably automatically, and hence it is the actual unit 30 which is pointed towards a desired setting-out point with the aid of the computer 16', preferably, the prism bearer will be able to see the light emitted by the indicator, and consequently the indicator should not be rotated in relation to the direction of alignment of the instrument to an extent such that no part of the emitted light beams will impinge on the prism bearer. Consequently, the indicator is preferably rotated in the direction in which the prism bearer is intended to move, although not all the way so as to be aligned directly with the target if the movement angle exceeds a given angle. The instrument is then turned towards the target, when the prism bearer carries the prism thereto while guided by the light signal from, the lobes 32 and 34 until, instead of discerning a colored light, the prism bearer enters the beam overlap region 34 and sees a white or grey light. The computer 16' controls the voltage supply to the light sources of the unit 30 such that the emitted light beams will flash on and off in an intended code sequence for radial movement of the prism relative to the measuring instrument.

Figure 5:
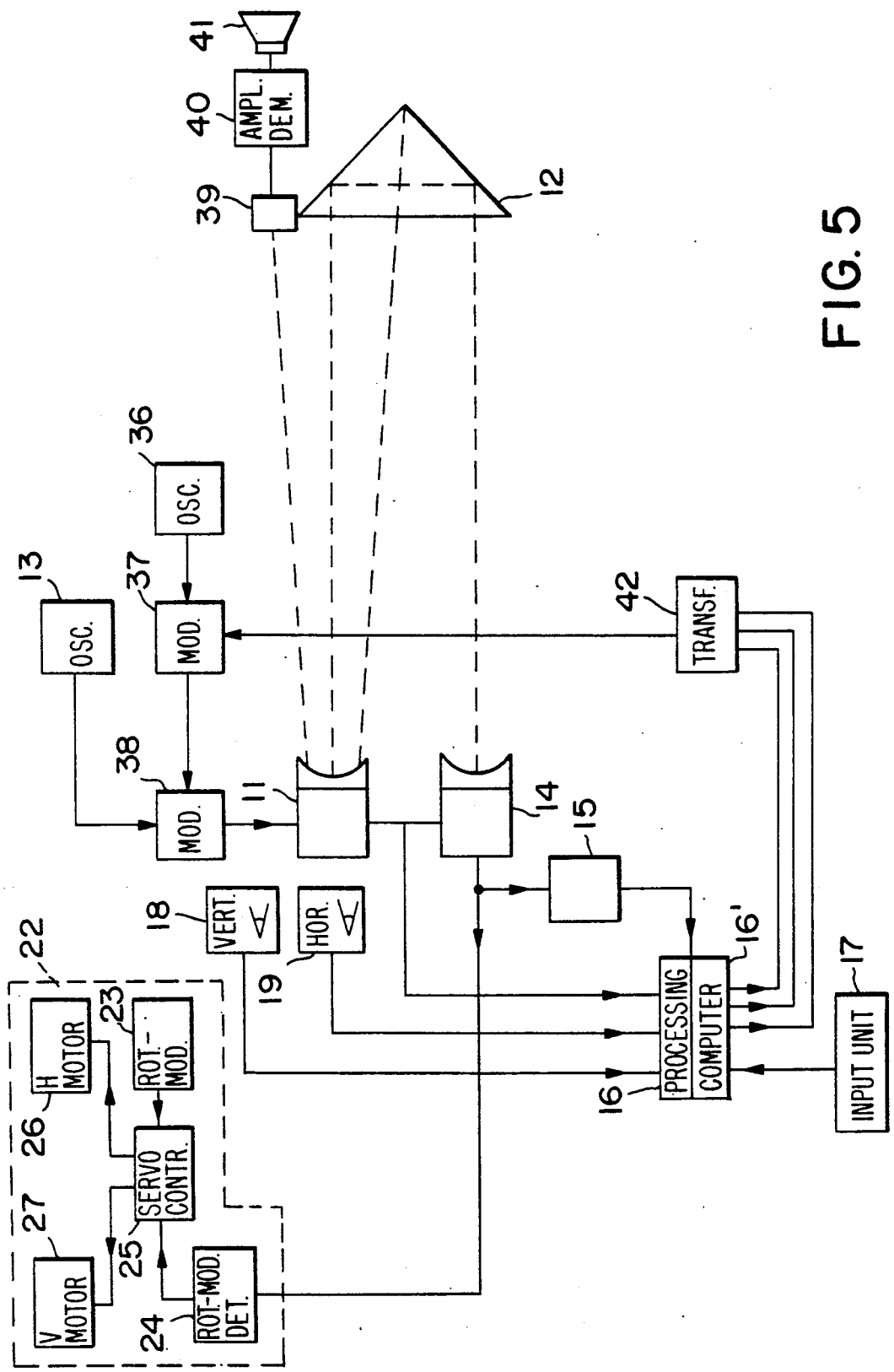
FIG. 5 is a block schematic diagram illustrating a distance measuring instrument equipped with a third embodiment of the inventive arrangement.

FIG. 5 illustrates a distance measuring instrument which is provided with a third embodiment of the invention. In the case of this embodiment, the instrument and prism 12 are provided with a sound transmitting arrangement of the kind disclosed in the aforementioned U.S. Pat. No. 4,560,270. This arrangement includes an additional oscillator 36, the output signal of which is fed to a modulator 37, which also receives a sound frequency signal, which is intended for transmission and which is modulated on the oscillator signal by the modulator 37. The amplitude of the moderator output signal is modulated on the measuring signal from the oscillator 13 by a second modulator 38. The output signal of the modulator 38 is fed to the transmitter 11. The prism 12 is fitted with a small receiver 39 which is located so as to capture a part of the modulated light beam transmitted by the transmitter 11. The output signal of the receiver 39 is amplified and demodulated in an amplifier and demodulator 40. The demodulated signal is fed to a loudspeaker 41.

According to the invention, the deviation values for desired positioning of the prism on a boundary mark computed by the computer 16' are fed to a converter 42, which converts the signals arriving from the computer to an audio-frequency signal which may have, for instance, three different tone pitches, two for deviation from, e.g., a desired horizontal or vertical angle position in one direction or the other and one pitch which indicates that the prism has been located in the desired angle position. The same kind of morse-code information as that applied for deviation in the radial direction can also be applied to the acoustic signal. The audio-frequency signal from the converter 42 is fed to the modulator 37 and, subsequent to being transferred from the transmitter 11 to the receiver 39, is delivered to the prism bearer from the loudspeaker 41 in the form of acoustic information. Alternatively, the converter 42, instead of being constructed to convert to coded light signals, may be provided with a digital numerical circuit which is constructed to emit from the different incoming digital data audio-frequency signals which contain speaking messages in clear words and in cyclic sequence, such as "left, up, distance is all right, left . . . ".

What is claimed is:

1. An ancillary arrangement for application with a distance measuring instrument means when setting out boundary marks, the distance measuring instrument being of a type which includes an electronic distance meter, a vertical angle meter (18) and a horizontal angle meter (19), a signal processing and computing unit (16, 16') which computes a position of a measuring reflector (12) in relation to the instrument, and input means (17) for input of the desired boundary settings of an area of ground into a memory location of a memory store in said computing unit prior to setting out said boundary, wherein the distance measuring instrument is adapted to be held directed towards the reflector and to carry out repeated measurements thereon; wherein the computing unit (16) is constructed to ascertain with each measuring operation whether measuring data obtained coincides or deviates from setting-out data within a predetermined acceptable tolerance range, and when deviation is observed to compute the direction or directions in which the reflector must be moved in order to be positioned in a location determined by said setting-out data and to provide movement direction signals; and comprising an indicator which is steered by said movement direction signals produced by the computing unit so as to produce continuously on the basis of said signals a clearly discernible indication of a code which can be readily understood during a working procedure by a person placed adjacent the reflector and which indicates whether the position of the reflector is to be moved, and if so, in which direction.

2. An arrangement according to claim 1, wherein the indicator (20) is firmly mounted on the instrument and is directed to transmit a selectively coded light beam in essentially the same horizontal angle position as the measuring beam transmitted by the instrument.

3. An arrangement according to claim 1, wherein the indicator (30) is a rotatable unit which is mounted on the instrument and which is constructed to emit two light beams which are positioned side by side, which partially overlap one another in a narrow region and which are turned in a direction towards the angle position to which the reflector (12) is to be moved by a rotational motor (31) controlled by the computing unit (16); and wherein the computing unit (16') is constructed to control the indicator (30) such that the indicator will cause the light beam to flash on and off in a predetermined flashing sequence indicative of the movement required of the measuring object in a second direction in order for the reflector to be positioned in a location determined by the boundary setting data fed into the memory of the computing unit.

4. An arrangement according to claim 1, wherein the indicator (39-41) is placed on the reflector and movement signals computed by the computing unit (16') are transmitted from the instrument to the indicator and delivered by the indicator as audible signals.

5. An arrangement according to claim 1, wherein the measuring instrument is provided with housing means (22) for holding the instrument constantly directed towards the measuring reflector.

6. An arrangement according to claim 1, wherein at least one directional movement coding differs in dependence on whether the distance to the boundary setting point lies outside or within an approximative area of the point.

7. An arrangement according to claim 1, wherein the indicator (20) is an optical indicator placed on the measuring instrument and is constructed to give a light signal in the form of a simple discernible code for each of the intended directional movements of the reflector to be indicated.

8. An arrangement according to claim 2, wherein the optical indicator transmits light of different colors for positional changes in a first direction and flashing lights of different flashing characters for positional changes in a second direction.

9. An arrangement according to claim 1, wherein the distance measuring instrument is used as an aid in working a large surface area, wherein the computing unit is constructed to cause the indicator to emit a first form of coding, and optionally to produce a second type of coding of different code character for deviation from the area, for indicating the direction in which the deviation has occurred.

10. An arrangement according to claim 9, wherein said indicator emits a flashing light for deviations outside the area in one direction but has said first kind of code character for deviation along a first coordinate direction and said second kind of code character for deviation along a second coordinate direction.

11. An arrangement according to claim 9, wherein said second type of coding is a color coding.

* * * * *